(12) United States Patent
Benayoun et al.

(10) Patent No.: US 7,006,498 B2
(45) Date of Patent: Feb. 28, 2006

(54) SYSTEM FOR TRANSMITTING LOCAL AREA NETWORK (LAN) DATA FRAMES THROUGH AN ASYNCHRONOUS TRANSFER MODE (ATM) CROSSBAR SWITCH

(75) Inventors: Alain Benayoun, Cagnes sur Mer (FR); Patrick Michel, La Gaude (FR); Gilles Toubol, Villeneuve-Loubet (FR)

(73) Assignee: International Business Machines Corporation, Armonk, NY (US)

( * ) Notice: Subject to any disclaimer, the term of this patent is extended or adjusted under 35 U.S.C. 154(b) by 868 days.

(21) Appl. No.: 09/920,683

(22) Filed: Aug. 2, 2001

(65) Prior Publication Data

US 2002/0021694 A1 Feb. 21, 2002

(30) Foreign Application Priority Data

Aug. 9, 2000 (EP) .................................. 00480076

(51) Int. Cl.
*H04L 12/28* (2006.01)
*H04L 12/56* (2006.01)
*H04L 12/66* (2006.01)

(52) U.S. Cl. ............... 370/392; 370/395.4; 370/395.53; 370/395.6; 370/401; 370/466; 709/249

(58) Field of Classification Search ................ 370/392, 370/387, 466, 395.51, 401, 503, 395.4, 395.53, 370/395.6, 473; 709/250, 249; 340/7.26
See application file for complete search history.

(56) References Cited

U.S. PATENT DOCUMENTS

| | | | | |
|---|---|---|---|---|
| 5,166,931 A | * | 11/1992 | Riddle ......................... | 370/401 |
| 5,251,207 A | * | 10/1993 | Abensour et al. ............ | 370/473 |
| 5,369,682 A | * | 11/1994 | Witsaman et al. ......... | 340/7.26 |
| 5,991,817 A | * | 11/1999 | Rowett et al. .............. | 709/250 |
| 6,188,692 B1 | * | 2/2001 | Huscroft et al. ....... | 370/395.51 |
| 6,252,887 B1 | * | 6/2001 | Wallace ...................... | 370/466 |
| 6,535,513 B1 | * | 3/2003 | Yildirim et al. ......... | 370/395.1 |
| 6,560,228 B1 | * | 5/2003 | Kingsley .................... | 370/392 |
| 6,738,392 B1 | * | 5/2004 | Thurston .................... | 370/503 |
| 6,747,971 B1 | * | 6/2004 | Hughes et al. .............. | 370/387 |
| 6,826,187 B1 | * | 11/2004 | Hey et al. ................ | 370/395.6 |

* cited by examiner

*Primary Examiner*—Alpus H. Hsu
(74) *Attorney, Agent, or Firm*—Scott W. Reid; Dillon & Yudell LLP

(57) ABSTRACT

An improved data transmission system including multiple local area networks (LANs) coupled by a hub that further includes multiple LAN adapters coupled to the LANs, and an asynchronous transfer mode (ATM) crossbar switch coupling all LAN adapters. LAN data frames are converted into concatenated slots of an identical size and transmitted through the ATM crossbar switch. At least the requesting LAN adapter coupled to the LAN to transmit LAN data frame includes a serial communication controller (SCC) that converts a received LAN data frame into serial data. The SCC also includes a means for converting serial data to LAN data frames.

28 Claims, 5 Drawing Sheets

SYSTEM FOR TRANSMITTING LOCAL AREA NETWORK (LAN) DATA FRAMES THROUGH AN ASYNCHRONOUS TRANSFER MODE (ATM) CROSSBAR SWITCH

BACKGROUND OF THE INVENTION

1. Technical Field

The present invention relates in general to the transmission of data between local area networks (LANs) and in particular to a system for transmitting data between LANs through an asynchronous transfer mode (ATM) crossbar switch.

2. Description of the Related Art

Today, asynchronous transfer mode (ATM) technology is improving at a rapid rate. Most research developments in this field are concentrated in high-speed ATM networks instead of LANs. Extremely high speed ATM switches are now readily available and are utilized for transferring data between LANs coupled to the ATM switch. The utilization of the ATM technology for switching LAN frames requires a transformation of each LAN frame by splitting the LAN frame into ATM frames. This is accomplished by encapsulating each LAN frame in the ATM adaptation layer (AAL) format.

The LAN frame is transformed into ATM data packets in the AAL format via a special module. The LAN frame is then transferred to the switch card for switching. Such a requirement results in two major drawbacks. Since the frame is converted into ATM cells, a header in each cell including protocol information (e.g., destination address) is required. A second drawback is that the transformation of the LAN frame into ATM cells and the encapsulation in the AAL format requires important and costly hardware and software.

Consequently, it would be desirable for a system and method of exchanging data between multiple LANs without the protocol information header and the utilization of costly hardware and software.

SUMMARY OF THE INVENTION

To overcome the foregoing and additional limitations in the prior art, the present invention provides an improved data transmission system including multiple local area networks (LANs) coupled by a hub that further includes multiple LAN adapters coupled to the LANs. The present invention further includes an asynchronous transfer mode (ATM) crossbar switch coupling all LAN adapters.

When at least one LAN requests transmission of LAN data frames to several destination LANs, the LAN data frames are converted into concatenated slots of an identical size and transmitted through the ATM crossbar switch. At least the requesting LAN adapter coupled to the LAN to transmit LAN data frame includes a serial communication controller (SCC) that further includes a means for converting the LAN data frame into serial data implemented as concatenated slots of the ATM cell size in the high-level data link control (HDLC) format before transmitting the serial data to the ATM crossbar switch. The SCC also includes a means for converting serial data implemented as concatenated ATM cells received from the ATM crossbar switch into a LAN data frame before transmitting the LAN data frame to the receiving LAN.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
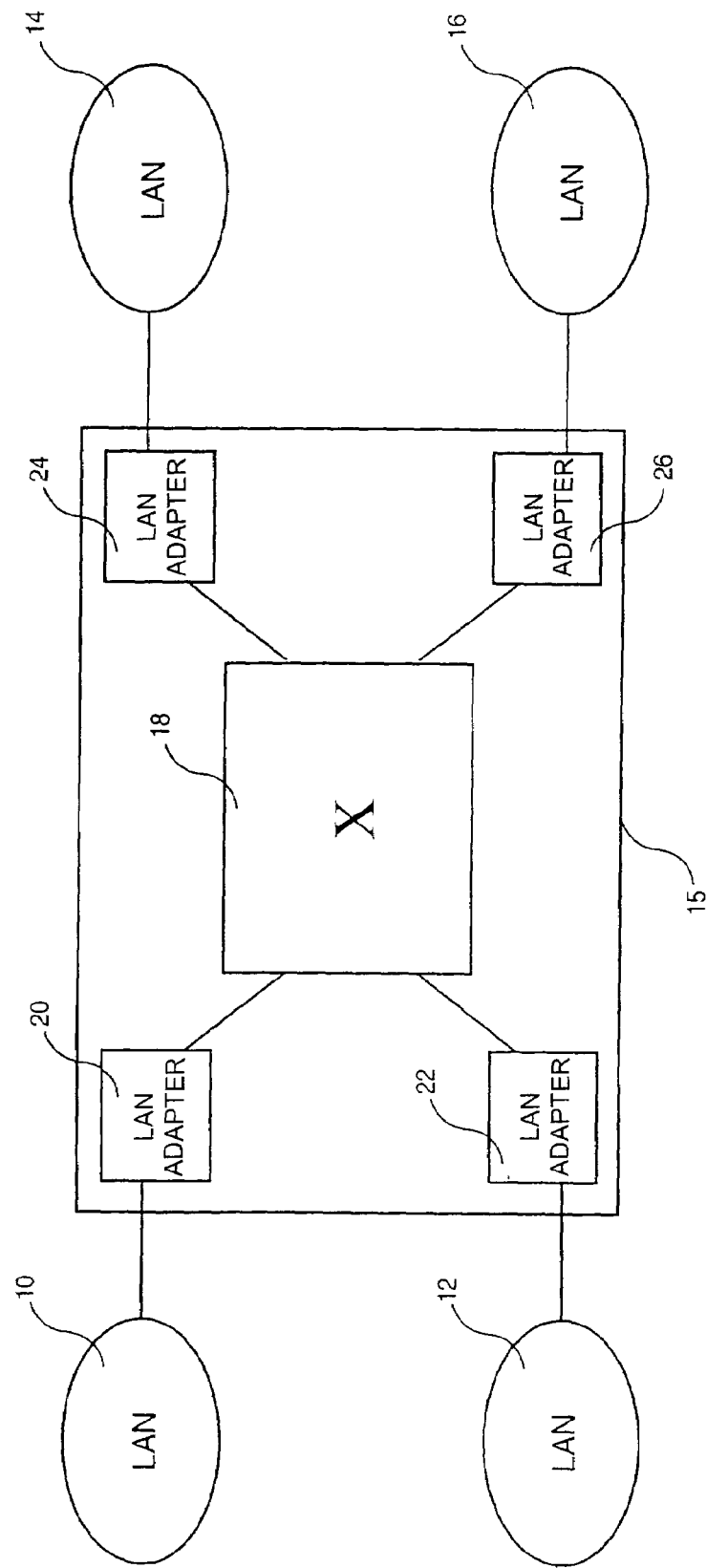
FIG. 1 illustrates block diagram of an exemplary data transmission system including four local area networks (LANs) coupled by a hub according to a preferred embodiment of the present invention.

With reference to the figures, and in particular, with reference to FIG. 1, there is depicted a block diagram of a preferred embodiment of the present invention. Multiple local area networks (LAN) 10, 12, 14 and 16 are coupled by a hub 15, which includes an asynchronous transfer mode (ATM) crossbar switch 18 and multiple LAN adapters 20, 22, 24 and 26. LAN 10 is coupled to switch 18 via LAN adapter 20, LAN 12 is coupled to switch 18 via LAN adapter 22, LAN 14 is coupled to ATM switch 18 via LAN adapter 24, and LAN 16 is coupled to ATM crossbar switch 18 via LAN adapter 26.

Figure 2:
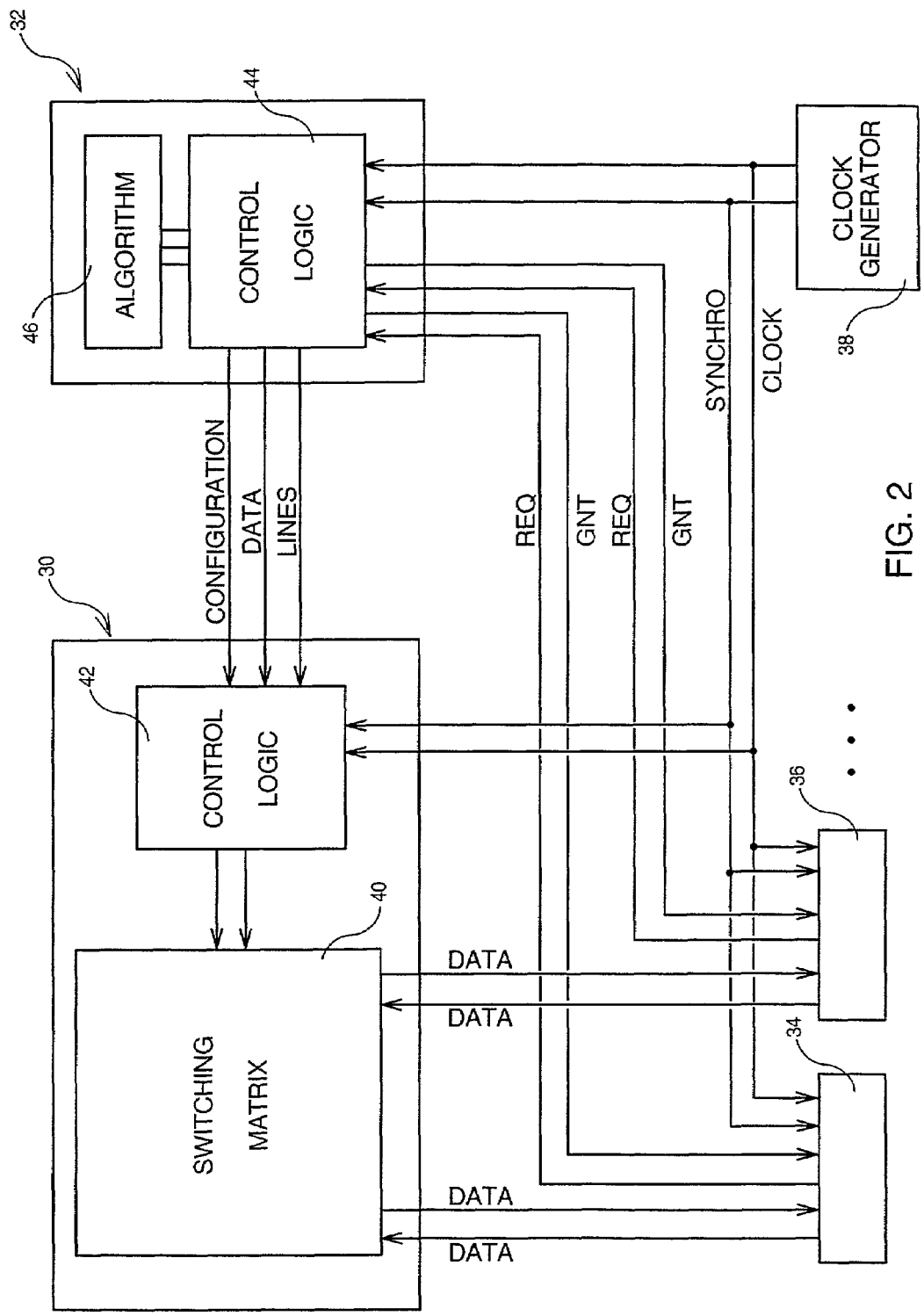
FIG. 2 depicts a block diagram of an asynchronous transfer mode (ATM) crossbar switch utilized within the hub according to a preferred embodiment of the present invention.

Referring to FIG. 2, there is illustrated an ATM crossbar switch 18 that includes a data switch module 30, a scheduler 32, multiple LAN adapter connectors 34 and 36 coupling multiple LANs to ATM crossbar switch 18, and a clock generator 38 for supplying the clock and the synchronization to data switch module 30, scheduler 32 and to LAN adapter connectors 34 and 36.

Data switch module 30 includes a switching data block 40, which is generally implemented as a passive switching matrix between data input signals from the LAN adapters to the switching matrix and data output signals from the switching matrix to the LAN adapters. Data switch module 30 also includes a control logic 42, which decodes the configuration signals received from scheduler 32 to determine the data path connections and establishes the data path connection based on the synchronization signal received from clock generator 38.

Scheduler 32 also includes an algorithm unit 46, which determines the best data connection to establish each time a request is issued by a requesting LAN. Such a determination is based on the selection of the request amongst all requests received from the requesting LAN adapters that meets some predetermined criteria such as a priority order, the selection of unicast/multicast, the selection between reserved bandwidth data and non-reserved bandwidth data or any other criteria defined by the user.

Figure 3:
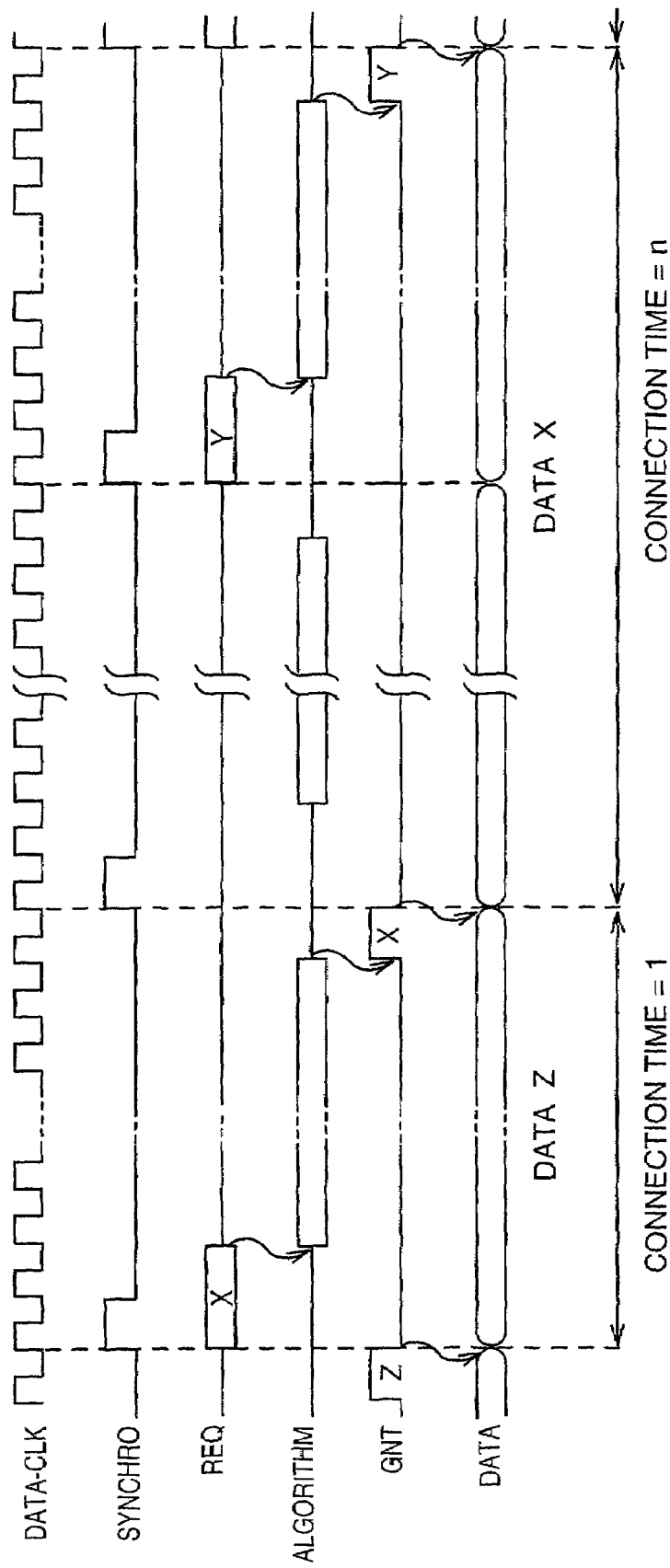
FIG. 3 illustrates a diagram representing a set of main signals exchanged between the ATM crossbar switch illustrated in FIG. 2 and the LAN adapters according to the invention.

With reference to FIG. 3, there is depicted a relationship between the signals at the interface between the ATM crossbar switch and LAN adapters. First, the data clock pulses are utilized to exchange the LAN frames between the adapters through the switch card. Fifty-three clock pulses determine the time slot to exchange fifty-three data bytes corresponding to the ATM cell size.

The SYNCHRO signal is a one clock pulse during the first data byte of each time slot. The REQ signal is active during the first two data bytes of a time slot. Then, the process occurs during the following fifty bytes of the slot. Finally, the grant (GNT) signal, when delivered for this REQ signal, is a one clock pulse during the fifty-third data byte of the slot. Thus, as depicted in FIG. 3, a request X for transmitting n slots is received at the beginning of the slot. Only one slot of data Z resulting from the preceding request is transmitted during this slot, and the grant signal for X is received at the end of the slot. Then, the corresponding data are transmitted during the following n slots. Note that during the last slot of this sequence of n slots, a new request Y is received and granted for the transmission of the corresponding data during the subsequent slots.

The REQ signal generated by each LAN adapter requesting transmission of a frame to the switch card is a serially encoded signal during the first four bytes of a time slot and includes thirty-two bits which are sampled by a signal at the frequency of the data clock multiplied by sixteen. The first pair of data bytes of the REQ signal includes the routing destination address on sixteen bits, one bit per LAN adapter, and a bit set when the destination address corresponds to the associated LAN adapter. This encoding scheme allows either a point-to-point connection, a multicast connection or a broadcast connection. The second pair of data bytes of the REQ signal contains the connection time on sixteen bits, or the number of time slots required to transmit the entire frame.

At each synchronization pulse, control logic 44 of scheduler 32 (as illustrated in FIG. 2) stores the thirty-two bits included in the REQ signal from all LAN adapters. Then, algorithm unit 46 determines the best connection, sets the configuration data lines for switch module 30, and activates the GNT signal to the selected LAN adapters. This new matrix switching state is latched into switching matrix 40 on the falling edge of the GNT signal by control logic 42 of switch module 30.

Figure 4:
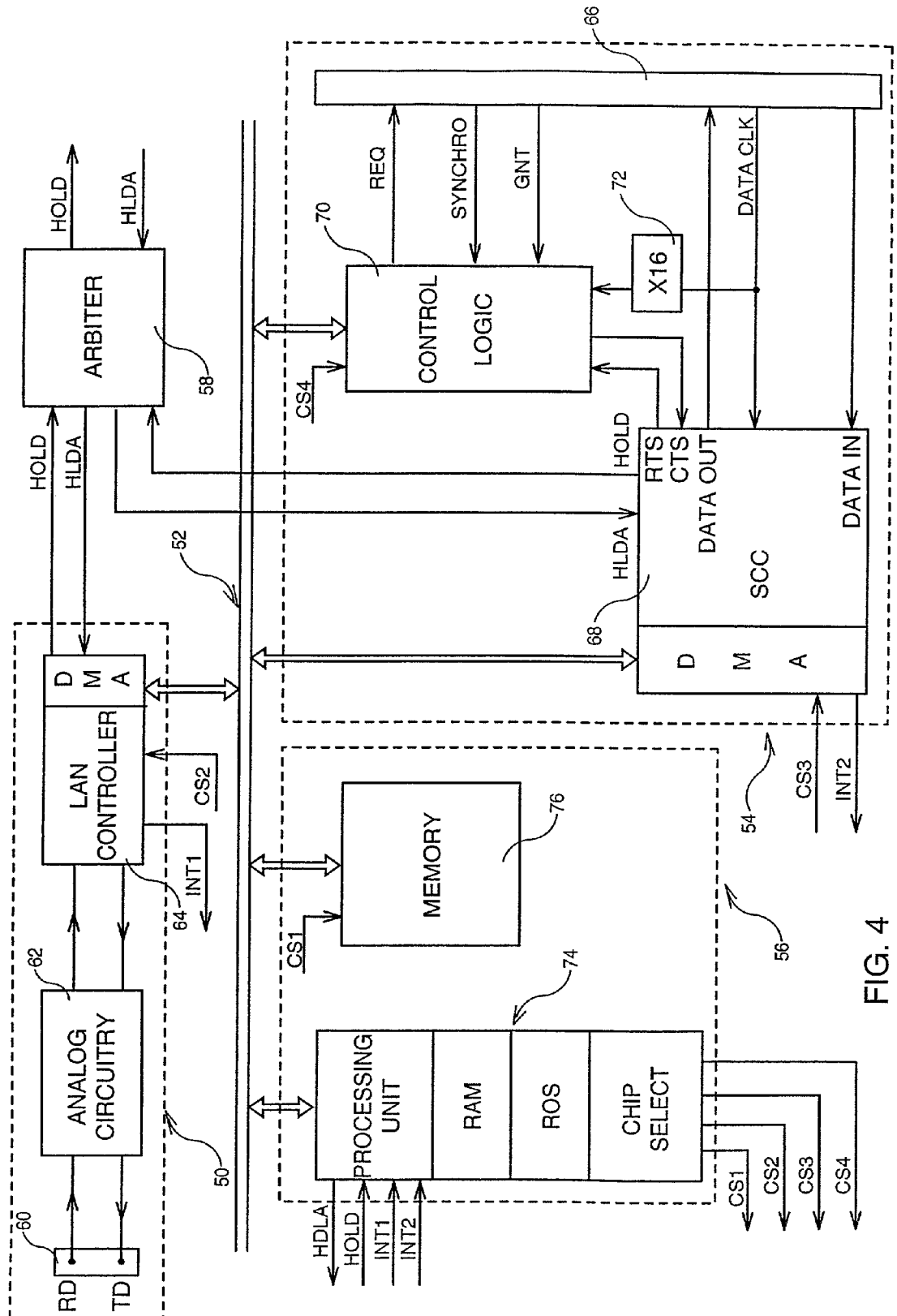
FIG. 4 depicts a block diagram of a LAN adapter within a data transmission system according to a preferred embodiment of the present invention.

Referring now to FIG. 4, there is an illustration of the hardware architecture of a LAN adapter, including a LAN logic 50 for processing the exchange of data with the LAN, a general bus 52 for transferring data bytes, a switch logic 54 for processing the exchange of data with the switch card, a system bus logic 56 for processing the transfer of data in the LAN adapter, and an arbiter 58 for taking care of any bus contention for the requests that may be transferred from LAN controller 64 or serial communication controller (SCC) 68.

LAN logic 50 includes a LAN connector 60 that couples the LAN adapter to the LAN through a LAN attachment cable and relays the transmit data signal (TD) and the receive data signal (RD). Also included in LAN logic 50 is analog circuitry 62 for converting the TTL logic signals to analog signals and analog signals to TTL logic signals. Analog circuitry 62 also provides specified network characteristics such as impedance, capacitance, crosstalk. LAN logic 50 also includes a LAN controller 64, which, in response to receiving a frame from the LAN, synchronizes an internal receive clock circuitry during the seven preamble bytes, detects the LAN frame through the Start Frame Delimiter (SFD) byte, checks the data integrity of the frame by computing/comparing the four Frame Check Sequence (FCS) bytes, removes the protocol information such as preamble bytes, SFD byte and FCS bytes, and deserializes the remaining incoming bits to provide data bytes at the parallel interface with bus 52.

When transmitting data bytes from the parallel interface with bus 52 to the LAN, the LAN controller 64 serializes the incoming parallel bytes, generates the protocol information bytes, and computes and sends the FCS bytes.

In a preferred embodiment of the present invention, LAN controller 64 is a master device with an internal direct memory access (DMA) that controls the transfer of bytes on the parallel interface with bus 52.

Switch logic 54 includes a switch connector 66, a SCC 68 for both transmitting and serially receiving to/from the switch card through connector 66, a control logic 70 for generating the request signal and synchronizing the timing between the switch card and the LAN adapter, and a clock multiplier 72 for providing control logic 70 with the transmit clock signal that generates the request signal at sixteen times the frequency of the data clock.

Connector 66 allows the connection of the LAN adapter to the switch card through a backplane and relays the request signal (REQ), the grant signal (GNT), the transmit data signal (DATA OUT), the receive data signal (DATA IN), the data clock signal (DATA CLK), and the synchronization signal (SYNCHRO).

When transmitting data bytes from the parallel interface to the switch card, the serial communication controller 68 generates a high-level data link control (HDLC) flag (one byte) to start a frame, serializes and sends the incoming parallel data bytes, computes and sends the Frame Check Sequence (FCS) [two bytes] after the data bytes, and generates an HDLC flag (one byte) to end the frame.

When receiving an HDLC frame from the switch card, SCC 68 detects the incoming frame through the flag, checks the data integrity of the frame by computing/comparing the FCS, and deserializes the incoming bits to provide data bytes at the parallel interface.

In a preferred embodiment of the present invention, SCC 68 is a master device with an internal DMA that controls the transfer of bytes on the parallel interface.

System bus logic 56 includes a microcontroller 74 and a memory 76. Microcontroller 74 includes a processing unit, a read-only storage (ROS) for storing the operational code, a random access memory (RAM) that operates like a cache memory and a programmable chip select for generating a memory chip select (CS1), a LAN controller chip select (CS2), a serial communication controller chip select (CS3) and a control logic chip select (CS4).

Memory 76 is divided in two independent areas, a LAN-to-switch area organized in a first section of 2K bytes buffers and a switch-to-LAN area organized in a second section of 2K bytes buffers.

It must be noted that general bus 52 includes a data bus, an address bus and control signals such as read, write, chip selects, interrupts, bus requests and bus acknowledges. The width of both the data bus and the address bus is not critical to the implementation of a preferred embodiment of the present invention.

Following a machine power-on or a reset, microcontroller 74 initializes the three main components of the LAN adapter: memory 76, LAN controller 64 and SCC 68, as illustrated in FIG. 4. The initialization of LAN controller 64 includes setting up the receive DMA of the controller with the base address of the LAN-to-switch buffer no. 1 in memory 76. Initialization of SCC 68 also includes setting up the receive DMA of the SCC with the base address of the switch-to-LAN buffer no. 1 in memory 76.

Assuming that a frame is received from the network on the receive line TD of connector 60, this frame is converted into TTL logic by analog circuitry 62 and transferred to LAN controller 64. While the incoming bits are stored in an internal receive first-in, first-out (FIFO), the receive DMA of LAN controller 64 requests the use of general bus 52 to access arbiter 58 by activating the HOLD signal. When the general bus 52 is free, arbiter 58 activates the HLDA signal. From now on, the receive DMA of LAN controller 64 transfers the bytes of the frame from the FIFO of the LAN controller wherein they are stored into the LAN-to-switch buffer no. 1 in memory 76. When the entire frame is stored in the memory, LAN controller 64 activates its interrupt signal INT1.

When receiving the interrupt signal INT1, microcontroller 74 stops its current task to execute a LAN interrupt routine by reading the interrupt register of LAN controller 64 to determine the cause of the interruption, initializing the receive DMA of LAN controller 64 with the base address of the LAN-to-switch buffer no. 2 in memory 76 (At this time a new frame coming from the network can be received), reading the frame byte count and the destination address, and jumping to a switch interface routine.

When running the switch interface routine, microcontroller 74 determines the address of the destination LAN adapter using routing tables (it can be a unique address, a multicast address or a broadcast address), determines the Connection time (TC) by dividing the frame count by fifty-three, stores both the destination address and the connection time in a parallel-to-series register located in control logic 70, initializes the transmit DMA of SCC 68 with the base address of the LAN-to-switch buffer no. 1 in memory 76 and the byte count, and starts the transmit DMA of SCC 68.

Then, the transmit DMA of SCC 68 requests the use of general bus 52 to access arbiter 58 by activating its HOLD signal. When the general bus is free, arbiter 58 activates the HLDA signal. At this time, SCC 68 activates its request-to-send line (RTS) to Control Logic 70 in order to transmit the frame to the switch card. When the Clear-to-send line (CTS) from Control Logic 70 is activated, the transmit DMA transfers the bytes from the LAN-to-switch buffer no. 1 of memory 76 into the switch card. These bytes are sent in an HDLC format to guarantee the data integrity through the backplane. When the LAN-to-switch no. 1 is empty, SCC 68 activates its interrupt line INT 2. It must be noted that the HDLC format uses a flag when the end of the frame is reached even if the last slot is less then fifty-three bytes, and does not require the use of padding bits to complete a fifty-three bytes cells as in the ATM procedure.

Figure 5:
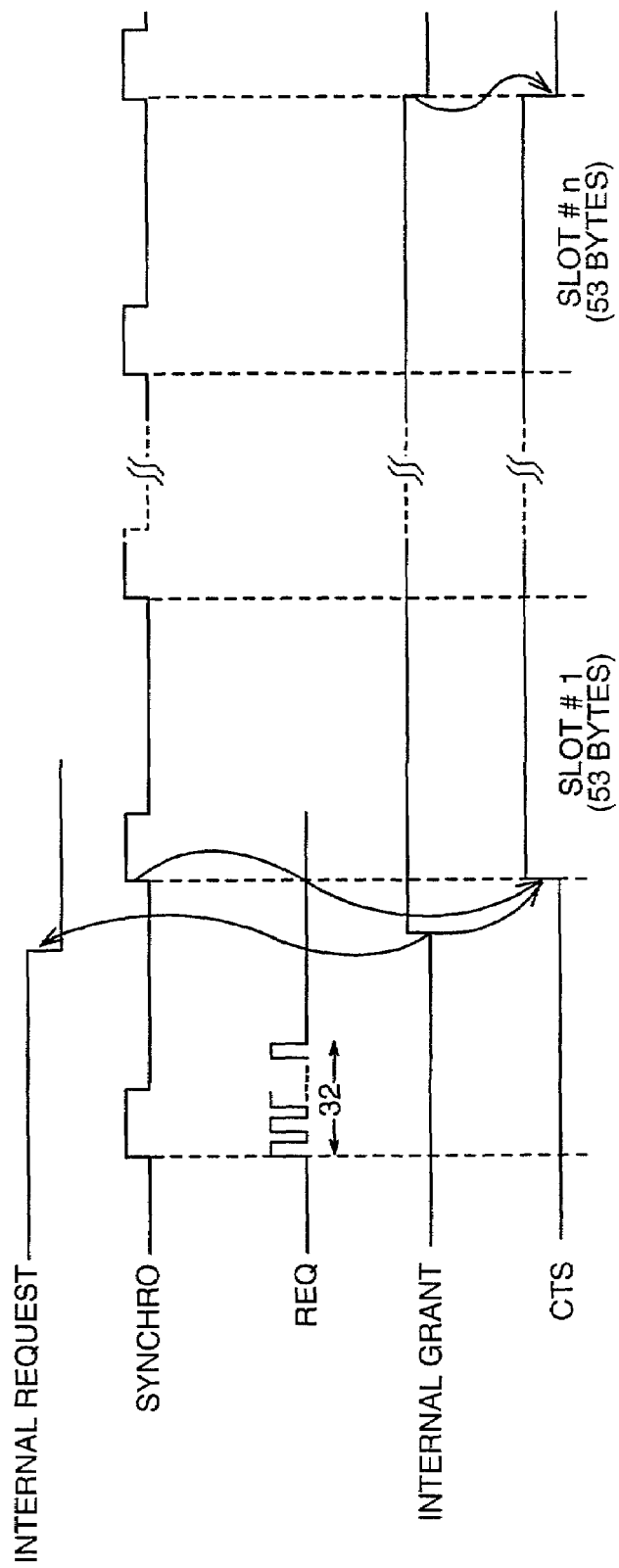
FIG. 5 illustrates a diagram representing a set of main signals exchanged in a LAN adapter according a preferred embodiment of the present invention.

Control logic 70 synchronizes the timing of the different actions described above, such as outputting the destination address and the connection time on the request signal, getting the grant signal and setting up the CTS signal, with the timing of the switch card. This timing is illustrated in FIG. 5.

When receiving the interrupt signal INT2 from SCC 68, microcontroller 74 stops its current task to execute a SCC interrupt routine by reading the interrupt register of SCC 68 to determine the cause of the interruption and releasing the LAN-to-switch buffer no. 1 in memory 76.

Also, when SCC 68 detects the reception of a frame from the switch card, SCC 68 requests the use general bus 52 to access arbiter 58 by activating the HOLD line and stores the incoming bits in an internal receive FIFO. When the general bus is free, arbiter 58 activates a HLDA line to SCC 68. From now on, the receive DMA of SCC 68 transfers the bytes of the frame from the FIFO of SCC 68 into the switch-to-LAN buffer no. 1 in memory 76. When the entire frame is stored in memory 76, SCC 68 activates its interrupt line INT2.

When receiving the interrupt signal INT2, microcontroller 74 stops the current task to execute the SCC interrupt routine by reading the interrupt register of SCC 68 to determine the cause of the interruption, initializing the receive DMA of SCC 68 with the base address of the switch-to-LAN buffer #2 of memory 76 (At this time a new frame coming from the switch card can be received), initializing the transmit DMA of LAN controller 64 with the base address of the switch-to-LAN buffer no. 1 of memory 76 and the byte count, and starting the transmit DMA of LAN controller 64.

Then, the transmit DMA of SCC 68 requests the use of general bus 52 to access arbiter 58 by activating its HOLD line. When the general bus is free, arbiter 58 activates the HLDA line to SCC 68. From now on, the transmit DMA of SCC 68 transfers the bytes of the frame from switch-to-LAN buffer no. 1 of memory 76 to the LAN. These bytes are transmitted serially through analog circuitry 62 onto the transmit line TD of connector 60. When the entire frame is sent out, LAN Controller 64 activates the interrupt line INT1 to microcontroller 74.

When receiving the interrupt signal INT1, microcontroller 74 stops the current task to execute the LAN interrupt routine by performing the actions of reading the interrupt register of LAN Controller 64 to determine the cause of the interruption and releasing the switch-to-LAN buffer no. 1.

What is claimed is:

1. A data transmission system, comprising:
   a crossbar switch;
   a plurality of network adapters coupled for communication therebetween by said crossbar switch, wherein each of said plurality of network adapters includes:
      a serial communication controller including:
         means for converting data frames into a bit stream of serial data before transmitting said serial data to said crossbar switch; and
         means for converting a bit stream of serial data received from said crossbar switch into data frames of parallel bytes before transmitting said data frames toward an attached network; and
      control logic for generating a request signal (REQ) to said crossbar switch when said adapter requests transfer of data frames to another network adapter, wherein said request signal (REQ) includes first data bytes defining a destination address of data to be transmitted and second data bytes representing a connection time defined by a number of slots of said crossbar switch in which the data are to be transmitted, wherein:
         said control logic comprises first control logic that generates said request signal (REQ) during a last time slot of a previous transmission via said crossbar switch;
         said crossbar switch includes second control logic for generating a grant signal (GNT) to a network adapter during said last time slot of said previous transmission; and said first control logic, responsive to receiving said grant signal (GNT), transmits data for said number of slots specified by said request signal (REQ) immediately after said last time slot of said previous transmission.

2. The data transmission system according to claim 1, wherein each of said plurality of network adapters includes:
a clock multiplier for multiplying a data clock and for providing said control logic with timing pulses utilized to transmit said request signal (REQ).

3. The data transmission system according to claim 1, wherein said first data bytes designate a point-to-point connection, a multicast connection, or a broadcast connection.

4. The data transmission system according to claim 1, wherein said means for converting data frames into a bit stream of serial data comprises:
means for generating serial data in a high-level data link control (HDLC) format before transmitting said serial data to said crossbar switch.

5. The data transmission system according to claim 4, wherein said means for generating serial data comprises:
means for generating a first flag to start a data frame;
means for serializing a plurality of incoming parallel data bytes;
means for computing a frame check sequence (FCS) after serializing said plurality of incoming parallel data bytes; and
means for generating a second flag to end the data frame.

6. The data transmission system according to claim 4, wherein said means for converting a bit stream of serial data received from said crossbar switch into data frames comprises:
means for converting serial data received from the crossbar switch in the a high-level data link control (HDLC) format into local area network (LAN) data frames.

7. The data transmission system according to claim 6, wherein said means for converting serial data received from said crossbar switch into data frames comprises:
means for checking data integrity by computing a frame check sequence (FCS).

8. The data transmission system according to claim 7, wherein each of said plurality of network adapters further includes:
a memory including a network-to-switch area organized in a first plurality of buffers for storing data to be transmitted via said crossbar switch, and a switch-to-network area organized in a second plurality of buffers for storing data received from said crossbar switch.

9. The data transmission system according to claim 1, wherein each of said plurality of network adapters further includes:
an internal parallel bus coupled to the serial communication controller; and
a network controller, coupled to the internal parallel bus, for converting data received in serial format from an attached network into parallel data bytes and for transmitting the parallel data bytes to the serial communication controller via the internal parallel bus.

10. The data transmission system according to claim 9, wherein said network controller further includes:
a clock circuit;
means for synchronizing said clock circuit during a set of preamble bytes when receiving an incoming data frame from an attached network;
means for detecting the incoming data frame through a delimiter byte;
means for checking data integrity of said incoming data frame by computing a set of frame check sequence (FCS) bytes;
means for removing protocol information of said incoming data frame; and
means for deserializing remaining incoming bits of said incoming data frame to provide a set of parallel data bytes.

11. The data transmission system according to claim 9, wherein said network controller further includes:
means for serializing a set of incoming data bytes received from said serial communication controller;
means for generating protocol information bytes to be included in an outgoing data frame; and
means for computing a frame check sequence (FCS) of said outgoing data frame before transmitting said outgoing data frame on an attached network.

12. The data transmission system according to claim 9, further comprising:
an arbiter for resolving contention between requests to send from said network controller and requests to send from said serial communication controller.

13. The data transmission system according to claim 1, wherein said crossbar switch further includes:
a scheduler for scheduling data transmission between attached networks based upon requests to transmit received from said plurality of adapters.

14. The data transmission system according to claim 13, wherein said scheduler further includes:
an algorithm unit for determining the best data connection to establish based upon selection of a request amongst all requests concurrently received from said plurality of adapters which meets a predetermined criterion.

15. A data transmission system, comprising:
an asynchronous transfer mode (ATM) crossbar switch;
a plurality of local area network (LAN) adapters coupled for communication therebetween by said ATM crossbar switch, wherein each of said LAN adapters includes:
a serial communication controller including:
means for converting parallel data bytes of a LAN data frame into a bit stream of serial data implemented as concatenated slots of an ATM cell size in high-level data link control (HDLC) format before transmitting said serial data to said ATM crossbar switch; and
means for converting a bit stream of serial data implemented as concatenated ATM cells received from said ATM crossbar switch into parallel bytes of a LAN data frame before transmitting said LAN data frame toward an attached LAN; and
control logic for generating a request signal (REQ) to said ATM crossbar switch when said LAN adapter requests transfer of at least a LAN data frame to another LAN adapter, wherein said request signal (REQ) includes first data bytes defining a destination address of data to be transmitted and second data bytes representing a connection time defined by a number of slots of said ATM crossbar switch in which the data are to be transmitted, wherein:
said control logic comprises first control logic that generates said request signal (REQ) during a last time slot of a previous transmission via said ATM crossbar switch;
said crossbar switch includes second control logic for generating a grant signal (GNT) to a LAN adapter during said last time slot of said previous transmission; and said first control logic, responsive to receiving said grant signal (GNT), transmits data for said number of slots specified by said request signal (REQ) immediately after said last time slot of said previous transmission.

16. The data transmission system according to claim 15, wherein each of said plurality of LAN adapters includes:
a clock multiplier for multiplying a data clock and for providing said control logic with timing pulses utilized to transmit said request signal (REQ).

17. The data transmission system according to claim 15, wherein said first data bytes designate a point-to-point connection, a multicast connection, or a broadcast connection.

18. The data transmission system according to claim 15, wherein said means for converting parallel bytes of a LAN data frame comprises:
means for generating a high-level data link control (HDLC) frame before transmitting said HDLC frame to said ATM crossbar switch.

19. The data transmission system according to claim 18, wherein said means for generating serial data comprises:
means for generating a high-level data link control (HDLC) flag to start said HDLC frame;
means for serializing a plurality of incoming parallel data bytes;
means for computing a frame check sequence (FCS) after said plurality of incoming parallel data bytes; and
means for generating another HDLC flag to end said HDLC frame.

20. The data transmission system according to claim 18, wherein said serial communication controller further includes:
means for converting a high-level data link control (HDLC) frame received from said ATM crossbar switch into a LAN data frame.

21. The data transmission system according to claim 20, wherein said means for converting a high-level data link control (HDLC) frame received from sad ATM crossbar switch into a LAN data frame comprises:
means for detecting a starting high-level data link control (HDLC) frame in an incoming HDLC frame;
means for checking the data integrity of said HDLC frame by computing a frame check sequence (FCS); and
means for deserializing a plurality of data bits of said HDLC frame to provide a plurality of data bytes in said LAN data frame.

22. The data transmission system according to claim 21, wherein each of said plurality of LAN adapters further includes:
a memory including a first LAN-to-switch area organized in a first plurality of buffers for storing LAN data frames to be transmitted to another LAN via the ATM crossbar switch, and a second switch-to-LAN area organized in a second plurality of buffers for storing LAN data frames received from another LAN via the ATM crossbar switch.

23. The data transmission system according to claim 15, wherein each of said plurality of LAN adapters includes:
an internal parallel bus coupled to the serial communication controller; and
a LAN controller, coupled to the internal parallel bus, for converting LAN data frames received in serial form from an attached LAN into parallel data bytes and for transmitting the parallel data bytes to the serial communication controller via the internal parallel bus.

24. The data transmission system according to claim 23, wherein said LAN controller further includes:
a clock circuit;
means for synchronizing said clock circuit during a set of preamble bytes when receiving an incoming LAN data frame from an attached LAN;
means for detecting said incoming LAN data frame through a delimiter byte;
means for checking data integrity of said incoming LAN data frame by computing a set of frame check sequence (FCS) bytes;
means for removing protocol information of said incoming LAN data frame; and
means for deserializing remaining incoming bits of said incoming LAN data frames to provide a set of parallel data bytes.

25. The data transmission system according to claim 23, wherein said LAN controller further includes:
means for serializing a set of incoming data bytes received from said serial communication controller;
means for generating protocol information bytes to be included in an outgoing LAN data frame; and
means for computing a frame check sequence (FCS) of said outgoing LAN data frame before transmitting said outgoing LAN data frame to an attached LAN.

26. The data transmission system according to claim 23, further comprising:
an arbiter resolving contention between requests to send from said LAN controller and requests to send from said serial communication controller.

27. The data transmission system according to claim 15, wherein said ATM crossbar switch further includes:
a scheduler for scheduling data transmission between attached networks based upon requests to transmit received from said plurality of adapters.

28. The data transmission system according to claim 27, wherein said scheduler further includes:
an algorithm unit for determining the best data connection to establish based upon selection of a request amongst all requests concurrently received from the plurality of LAN adapters which meets a predetermined criterion.

* * * * *

UNITED STATES PATENT AND TRADEMARK OFFICE
CERTIFICATE OF CORRECTION

PATENT NO. : 7,006,498 B2  Page 1 of 1
APPLICATION NO. : 09/920683
DATED : February 28, 2006
INVENTOR(S) : Benayoun et al.

It is certified that error appears in the above-identified patent and that said Letters Patent is hereby corrected as shown below:

On Title Page, Item (56), column 2, line 9, delete "Yildirim et al." and insert --Keo et al.--.

Signed and Sealed this

Twelfth Day of September, 2006

JON W. DUDAS
*Director of the United States Patent and Trademark Office*